US005706198A

United States Patent [19]

Schmitt et al.

[11] Patent Number: 5,706,198

[45] Date of Patent: Jan. 6, 1998

[54] TRACTION CONTROL SYSTEM WITH WHEEL SPEED CORRECTION TO COMPENSATE FOR DIFFERENT TIRE DIAMETERS

[75] Inventors: Johannes Schmitt, Markgroeningen; Dirk Saewe, Muehlacker; Armin Mueller, Backnang; Alfred Straub, Egenhofen, all of Germany

[73] Assignees: Robert Bosch GmbH, Stuttgart; Bayerische Motoren Werke AG, Munich; Mercedes-Benz AG, Stuttgart, all of Germany

[21] Appl. No.: 488,243

[22] Filed: Jun. 7, 1995

[30] Foreign Application Priority Data

Jul. 9, 1994 [DE] Germany ........................ 44 24 318.9

[51] Int. Cl.[6] ........................ B60K 28/16; B60T 8/76

[52] U.S. Cl. ........................ 364/426.027; 364/426.031; 364/426.036; 364/426.024; 303/133; 303/173; 180/170; 180/197

[58] Field of Search ........................ 364/426.03, 426.04, 364/431.07, 426.02, 426.01, 426.027, 426.031, 426.035, 426.036, 426.015, 426.024; 303/121, 122.01, 133, 139, 141, 147, 163, 171, 173; 180/197, 170

[56] References Cited

U.S. PATENT DOCUMENTS

| | | | |
|---|---|---|---|
| 3,680,655 | 8/1972 | Beyerlein et al. | 303/141 |
| 4,736,814 | 4/1988 | Yogo et al. | 180/197 |
| 4,884,650 | 12/1989 | Fujiki et al. | 180/197 |
| 5,178,231 | 1/1993 | Watanabe et al. | 180/197 |
| 5,179,526 | 1/1993 | Zimmer et al. | 364/426.02 |
| 5,253,728 | 10/1993 | Matsuno et al. | 364/424.05 |
| 5,299,131 | 3/1994 | Haas et al. | 364/426.03 |

*Primary Examiner*—Kevin J. Teska
*Assistant Examiner*—Tan Nguyen
*Attorney, Agent, or Firm*—Felfe & Lynch

[57] ABSTRACT

In order to avoid faults as a result of different diameters of tires, under prescribed conditions a correction of one wheel speed with respect to the other on each side of the vehicle is performed. The conditions are based on a comparison of the throttle valve angle to the zero torque angle, and a comparison of the speed of the driven wheel to the speed of the non-driven wheel.

5 Claims, 2 Drawing Sheets

TRACTION CONTROL SYSTEM WITH WHEEL SPEED CORRECTION TO COMPENSATE FOR DIFFERENT TIRE DIAMETERS

PRIOR ART

Traction control systems are known in which deviations in the speed of one wheel from that of the other wheel on the same side under specific conditions (no wheel slip) are used to produce a correction factor with which one of the wheel speeds is then adjusted to the other wheel speed. The determination of the slip with which the drive slip is to be compensated is then carried out using the corrected speed value. As a result, incorrect triggering of the system because of different wheel diameters can be avoided.

The system controls drive slip by varying wheel speed in a known way, e.g. by reducing engine torque or applying brakes, until the drive slip falls below a threshold value.

SUMMARY OF THE INVENTION

According to the invention, a correction factor for the wheels on each side of the vehicle is determined. This is done by comparing the speeds of the driven and non-driven wheels on each side of the vehicle, and by comparing the throttle valve angle to the zero torque angle. When the speed of the driven wheel is less than the speed of the non-driven wheel on the same side of the vehicle, and the throttle valve angle is greater than or equal to the zero torque angle, a correction factor for adjusting one of the wheel speeds is produced. Alternatively, when the speed of the driven wheel is greater than or equal to the speed of the non-driven wheel, and the throttle valve angle is less than the zero torque angle, a correction factor is produced.

The method makes possible a rapid and accurate correction of the wheel speeds.

DETAILED DESCRIPTION OF THE PREFERRED EMBODIMENT

Figure 1:
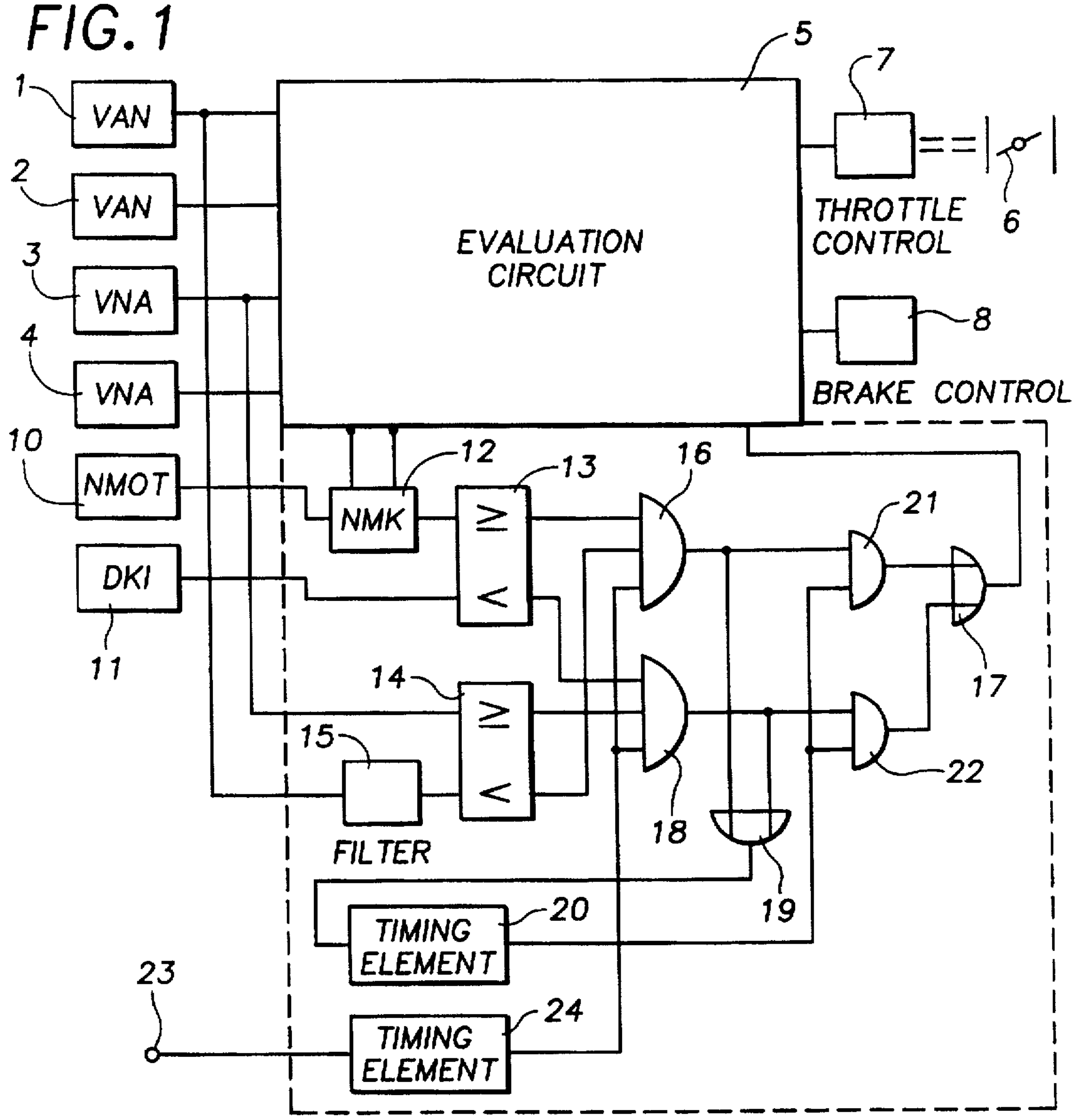
FIG. 1 is a system diagram for carrying out the invention.

In FIG. 1, the wheel speed sensors 1 and 2 of the driven wheels and the sensors 3 and 4 of the non-driven wheels feed signals to an evaluation circuit 5 which produces slip signals by comparing the wheel speed signals of one side of the vehicle (sensors 1 and 3 or 2 and 4, respectively), the slip signals triggering actuation of a throttle valve 6 by means of a final control element 7 and/or actuation of the wheel brakes of the driven wheels; this is indicated by means of a brake block 8.

When specific conditions are present, in order to avoid incorrect triggering of the traction control system the evaluation circuit 5 produces a correction factor—provided different tire sizes are present—, as a result of which—provided no wheel slip is present—the speed of one wheel is matched to the speed of the other on the same side of the vehicle. With this correction factor, the speed of one wheel is then corrected during the slip formation. By means of the invention, these conditions for determining the correction factor are specified.

For the sake of simplicity, the derivation of the conditions is explained for only one side of the vehicle with reference to FIG. 1 of the drawing. This applies in the same way for the other side of the vehicle.

Figure 2:
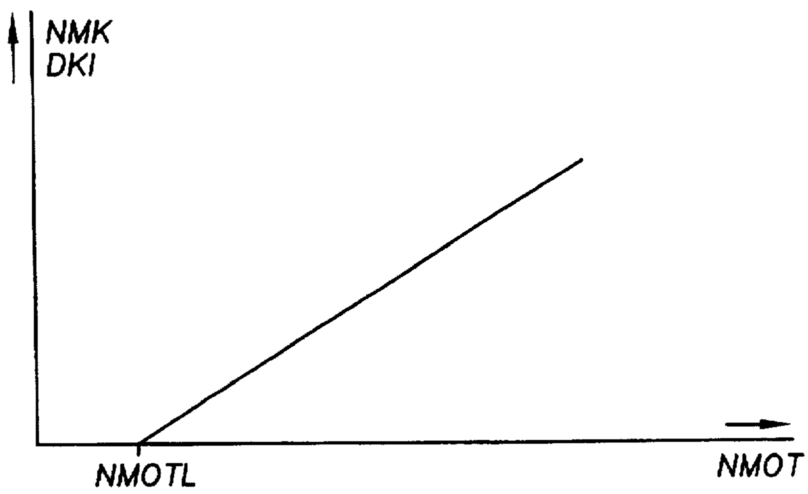
FIG. 2 is plot of engine speed versus throttle valve angle.

In FIG. 1, a sensor 10 for the engine speed NMOT and a sensor 11 for measuring the throttle valve angle DKI are additionally provided. In a block 12 within the extended evaluation circuit 5, the engine zero torque angle NMK is formed using a prescribed gradient measure NMOT_ST which is dependent on the configuration of the throttle valve, the engine speed NMOT and the idling speed NMOTL according to the relationship NMK=NMOT_ST(NMOT−NMOTL). The aforesaid relationship constitutes, with the engine speed NMOT as a variable, a straight line which is illustrated in FIG. 2. NMOT_ST can be, for example, 0.0028° min and NMOTL=200 $min^{-1}$. In a further block 13, the throttle valve angle DKI is compared with the zero torque angle NMK resulting from the engine speed NMOT. If the throttle valve angle DKI is greater than the zero torque angle NMK or equal to it, a signal is produced on the upper output line of the block 13 and is fed to an AND gate 16.

In a further comparator 14, the signal, filtered in a block 15, of the sensor 1 is compared with the signal of the sensor 3 (one side of the vehicle). If the filtered signal VANX of the sensor 1 is smaller than the signal of the sensor 3, a signal is produced on the lower output line of the comparator 14 and is also fed to the AND gate 16.

The AND gate 16 could become conductive by means of these two input signals alone and could transmit a signal via an OR gate 17 to the upper part of the evaluation circuit in order to enable the correction. Correspondingly, a further AND gate 18 could produce an output signal when the block 13 produces a signal on the lower line (DKI<NMK) and the comparator 14 produces a signal on the upper line (VANX≧VNAX). This signal could also be the trigger signal for the correction.

In the exemplary embodiment in FIG. 1, additional conditions for triggering are also provided. For this purpose, just the output signals of the AND gates 16 and 18 are fed via an OR gate 19 to a timing element 20. If a signal occurs at the output of one of the AND gates 16 or 18, the timing element 20 is triggered. After a period of, for example, 130 ms, the timing element 20 emits a signal with which additional AND gates 21 and 22 are prepared for conduction. The trigger signal is therefore not conducted through until it has lasted for 130 ms.

A superordinate permission signal is fed via a terminal 23 when the brake is not activated, the ABS/TCS is not active, there are no rapid changes in wheel speed or rapid changes in engine speed, the vehicle speed is higher than 35 km/h and cornering is not detected at either axle.

A further timing element 24 is triggered which after the above conditions exist for a prescribed time (for example, 500 ms) produces an output signal which is required in the exemplary embodiment in order to make the AND gates 16 and 18 conductive. The timing elements 20 and 24 are reset if their input signals do not occur.

Figure 3:
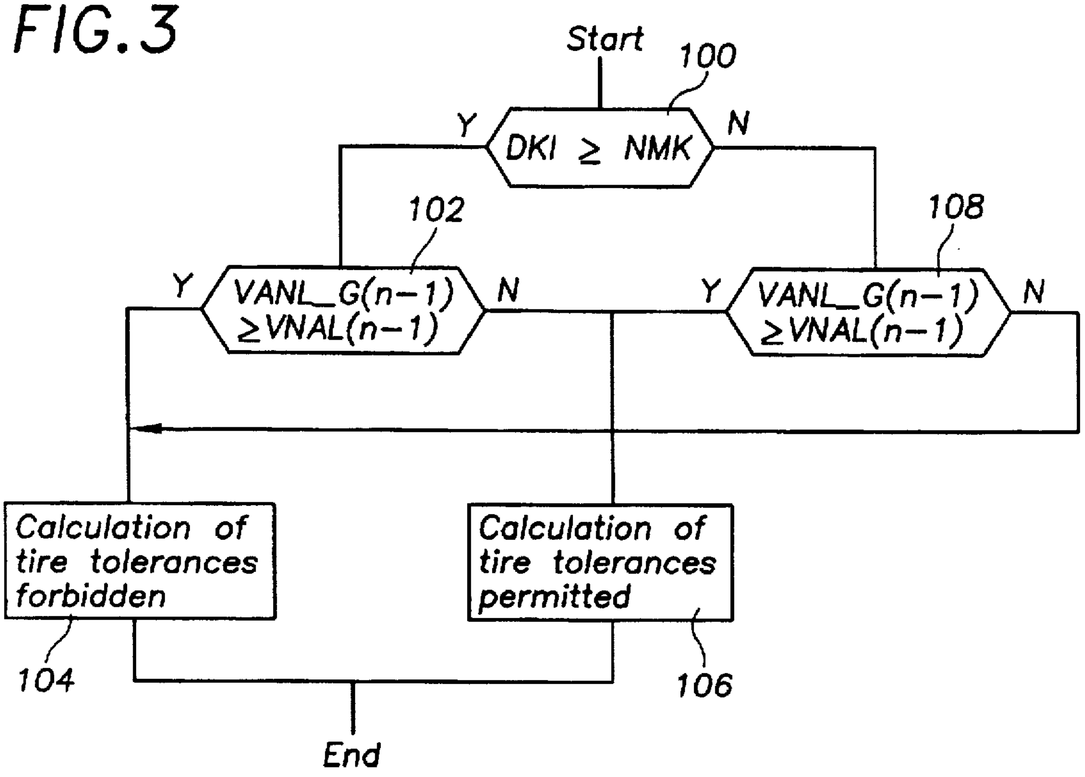
FIG. 3 is a logic diagram for permitting calculation of a tire correction factor for the left side of the vehicle.
Figure 4:
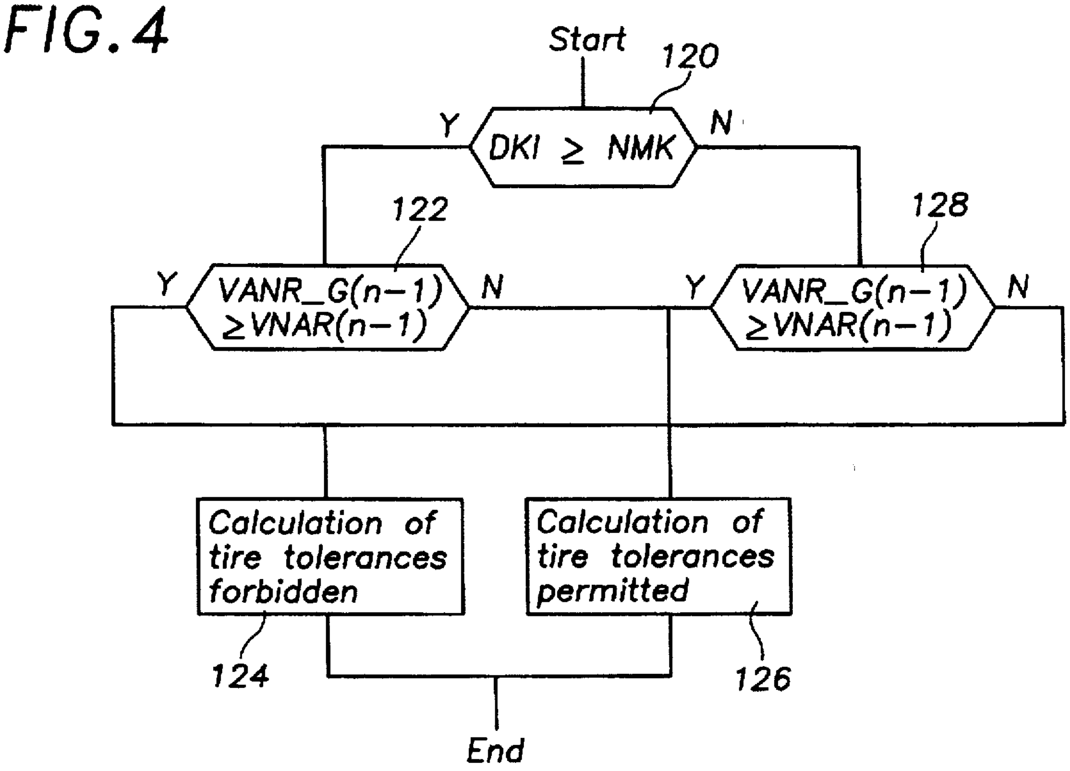
FIG. 4 is a logic diagram for permitting calculation of a tire correction factor for the right side of the vehicle.

FIGS. 3 and 4 show flow diagrams which outline the implementation of the procedure according to the invention as a computer program. FIG. 3 shows a flow diagram for permitting the calculation of a tire correction factor for the left-hand side of the vehicle, while FIG. 4 shows a flow diagram for permitting the calculation of the tire correction factor for the right-hand side of the vehicle.

After the part of the program illustrated in FIG. 3 starts, in the first interrogation step 100 the throttle valve angle DKI is compared with the engine zero torque angle NMK. If the throttle valve angle DKI is greater than or equal to the engine zero torque angle NMK, in the following interrogation step 102 the speed VANL_G(n−1) of the driven left-hand wheel, which speed VANL_G(n−1) was determined from the last computing cycle, possibly in a filtered manner, is compared with the speed VNAL(n−1) of the nondriven wheel which was determined in the last computing cycle. If the speed of the driven wheel is higher than or equal to the speed of the nondriven left-hand wheel, according to step 104 the calculation of the tire tolerances is forbidden. If the speed of the driven left-hand wheel is lower than the speed of the nondriven left-hand wheel, the calculation of the tire tolerances is permitted according to step 106. If it has been detected in step 100 that the throttle valve angle is smaller than the engine zero torque angle, in the following interrogation step 108 the speed of the driven left-hand wheel and the speed of the nondriven left-hand wheel are compared, in a way analogous to step 102. If the result is that the speed of the driven left-hand wheel is higher than or equal to the speed of the nondriven left-hand wheel, the calculation of the tire tolerances is permitted according to step 106. If, however, the speed of the driven left-hand wheel is lower than the speed of the nondriven left-hand wheel, according to step 104 the calculation of tire tolerances is forbidden. According to steps 104 and 106, the part of the program is terminated and repeated at a given time.

A corresponding procedure is adopted for the right-hand side of the vehicle. After the start of the part of the program in FIG. 4, in the first interrogation step 120 the throttle valve angle DK5 is compared with the zero torque angle NMK. If the throttle valve angle is greater than or equal to the zero torque angle, in the following interrogation step 122 the speed of the driven right-hand wheel VANR-G (n−1), which was determined, possibly in a filtered manner, from the last computing cycle, is compared with the speed of the nondriven right-hand wheel VANR (n−1) which was also determined from the last computing cycle for the speed. If the speed of the driven right-hand wheel is higher than or equal to the speed of the nondriven right-hand wheel, according to step 124 the calculation of the tire tolerances for the right-hand side of the vehicle is forbidden. If the speed of the driven wheel is lower than the speed of the nondriven wheel, according to step 126 the calculation of the tire tolerances for the right-hand side of the vehicle is permitted. Correspondingly, when the throttle valve angle is smaller than the zero torque angle in step 128, the speed of the driven right-hand wheel is compared with the speed of the nondriven right-hand wheel. If the speed of the driven right-hand wheel is higher than or equal to the speed of the nondriven wheel, according to step 126 the calculation of the tire tolerances is permitted, while in the other case, when the speed of the driven wheel is lower than the speed of the nondriven wheel, the calculation of the tire tolerances is forbidden according to step 124. After steps 126 and 124 the part of the program is terminated and repeated at a given time.

We claim:

1. Traction control method for a vehicle having driven wheels, non-driven wheels, and an engine generating torque determined by a throttle valve, said method comprising determining a throttle valve angle DKI, determining a zero torque angle NMK, determining the speed VANX of a driven wheel on one side of the vehicle, determining the speed VNAX of a non-driven wheel on said one side of the vehicle, comparing DKI to NMK, comparing VANX to VNAX, determining that a first pair of conditions is satisfied when DKI≧NMK and VANX<VNAX, determining that a second pair of conditions is satisfied when DKI<NMK and VANX≧VNAX, correcting wheel speeds on said one side of said vehicle to compensate for different tire diameters when one of said first and second pair of conditions is satisfied, determining drive slip based on said corrected wheel speeds, and varying wheel speeds until said drive slip falls below a threshold value.

2. Method as in claim 1 wherein one of said first and second pairs of conditions must be satisfied for a prescribed time before said wheel speeds are corrected.

3. Method as in claim 1 wherein prescribed conditions must last for a prescribed time before said wheel speeds are corrected, said prescribed conditions comprising at least one of an ABS/TCS being inactive, no rapid changes in engine speed, no rapid changes in wheel speed, vehicle speed above a prescribed speed value, and cornering not detected.

4. Method as in claim 1 wherein said zero torque angle NMK is determined by measuring engine speed NMOT and calculating NMK according to $$NMK=NMOT\_ST\ (NMOT-NMOTL)$$

wherein NMOT_ST is a gradient dependent upon configuration of the throttle value and NMOTL is an idling speed.

5. Method as in claim 1 further comprising filtering said driven wheel speeds VANX prior to comparing with said non-driven wheel speeds VNAX.

* * * * *

UNITED STATES PATENT AND TRADEMARK OFFICE
CERTIFICATE OF CORRECTION

PATENT NO : 5,706,198

DATED : January 6, 1998

INVENTOR(S) : Schmitt et al.

It is certified that error appears in the above-identified patent and that said Letters Patent is hereby corrected as shown below:

In column 3, line 37, change "VANR(n-1)"to --VNAR(n-1)--.

Signed and Sealed this

Fifteenth Day of June, 1999

Attest:

Q. TODD DICKINSON

*Attesting Officer* *Acting Commissioner of Patents and Trademarks*